Sept. 21, 1937.  J. E. WARRICK  2,093,593
LID FOR COOKING UTENSILS
Filed June 15, 1936

Inventor
Jane E. Warrick
By Arthur Minnick
Attorney

Patented Sept. 21, 1937

2,093,593

UNITED STATES PATENT OFFICE 2,093,593

LID FOR COOKING UTENSILS

Jane Elizabeth Warrick, Tampa, Fla.

Application June 15, 1936, Serial No. 85,295

2 Claims. (Cl. 53—8)

This invention relates to covers for cooking utensils and has for its object to provide lids so shaped as to form firm supports for superposed vessels, each lid cooperating with the bottom of the vessel resting thereon to form a steam chamber, whereby the heat furnished by a single burner may serve to cook the contents of several vessels.

A further object of the invention is to provide a lid with a substantially flat margin of sufficient width to receive any ordinary cooking vessel regardless of its shape, thus avoiding the necessity of purchasing vessels in expensive matched sets.

Another object of the invention is to arrange the perforations in the lid so that any water of condensation may return directly into the lower cooking utensil and not run over the edge of the lid.

With these and other objects in view, a preferred embodiment of the invention is illustrated in the accompanying drawing showing one of the forms in which the principle of the invention may be used.

Figure 1:
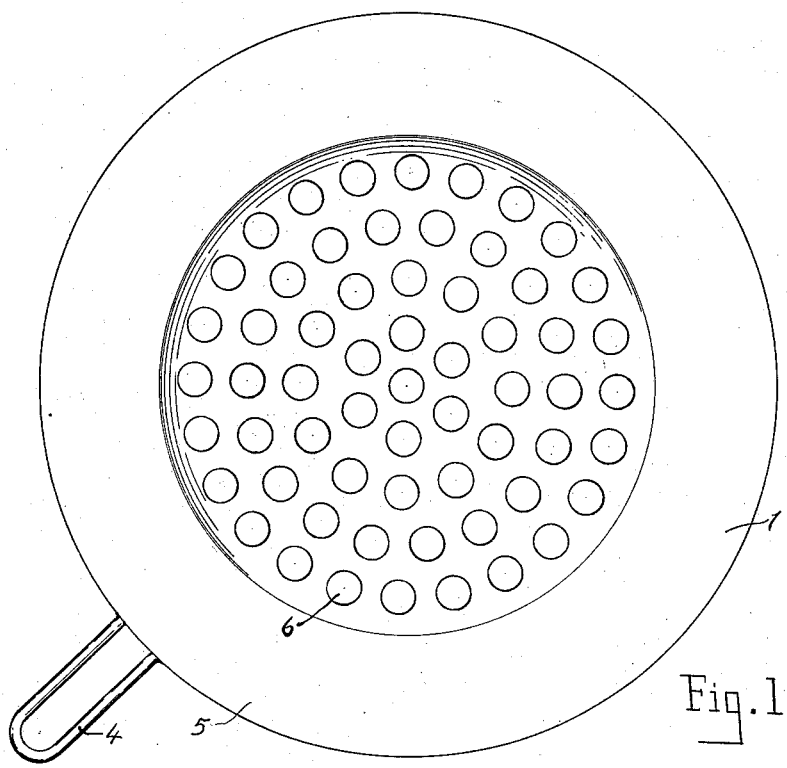
Figure 2:
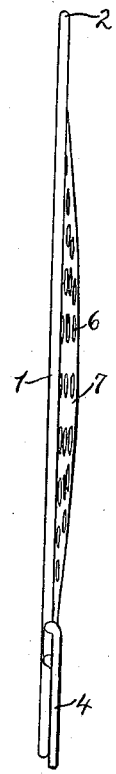

Figure 1 is a plan view of a typical form of lid; Fig. 2 is an edge view looking from the left in Fig. 1; and Fig. 3 is a sectional view showing two of the lids used in an assembly of three different cooking vessels.

The lid 1 will be stamped from a sheet of any suitable metal or alloy and its edge will preferably be rolled or formed into a bead over a wire 3. This wire is shown as formed into a loop 4 to constitute a radially extending handle substantially parallel with the plane of the margin 5. The central portion of the lid is perforated and depressed or dished over the entire area containing the perforations 6 as shown at 7 in Figs. 2 and 3.

Figure 3:
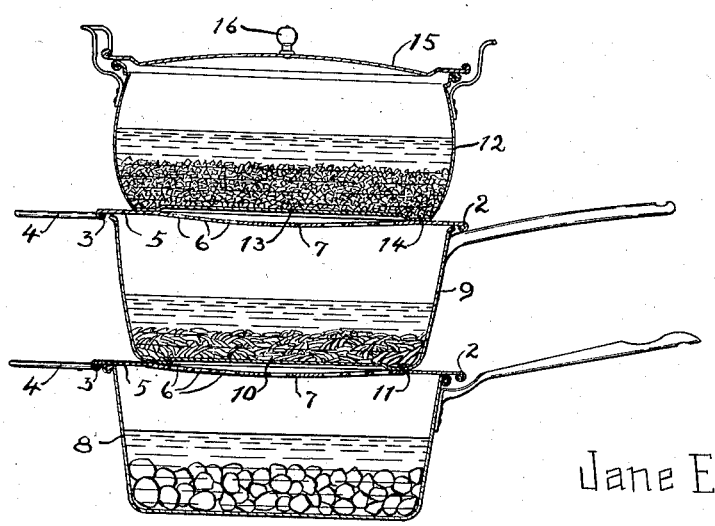

Three common types of cooking vessels are shown in Fig. 3, the lower one a sauce pan 8 having a flat bottom, the intermediate sauce pan 9 having a raised bottom 10 surrounded by an annular portion 11 which rests upon the flat margin 5 of the lid 1, and the upper kettle 12 also having the central portion 13 of its bottom raised and the outer annular portion 14 resting upon a second lid 1. Either or both of the upper vessels may, of course, have flat bottoms, the essential feature being that the outer portions of the bottoms shall come into close contact with the flat margin of the lids. A closed lid 15 of any ordinary kind is used to cover the top vessel 12.

The spaces between the bottom portion 10 or 13 and the central dished portion 7 of the lid 1 forms a closed steam chamber in which the steam coming from the vessel 8 or 9 can come into direct contact with the central portion of the vessel immediately above it. Heat is transferred much more quickly, and over the entire surface with which it is in contact in the steam, than in the case where a vessel rests upon an unperforated lid with which it is in contact at only three points, as will usually occur when irregularities are present in the lids or in the bottoms of the vessels. Cooking utensils are rarely perfectly flat on the bottom after they have been used.

The entire upper surface of the lid is free from obstructions which would prevent close contact of the flat bottom of a vessel with the flat upper surface of the margin surrounding the shallow central depressed portion.

Steam condensed in the chamber between the lid and the bottom of the utensil above it is not lost but the water runs back through some of the perforations into the vessel below.

I claim:

1. A lid for cooking vessels comprising a flat margin adapted to rest upon the rim of a vessel to be covered, and having a flat unobstructed upper surface upon said margin to receive a vessel to be heated, and having an integral perforated depressed central portion to permit steam from the vessel beneath to come into contact with the bottom of the vessel above the lid.

2. A lid for cooking vessels comprising a margin adapted to rest on the rim of a vessel to be covered and having a flat, unobstructed, annular portion adapted for close contact with the flat bottom of a vessel to be heated and having a continuous central portion provided with perforations and cooperating with the portion receiving the vessel and with the bottom of said vessel to form a closed steam chamber.

JANE ELIZABETH WARRICK.